(12) United States Patent
Sue et al.

(10) Patent No.: US 9,256,155 B2
(45) Date of Patent: Feb. 9, 2016

(54) IMAGE FORMING APPARATUS

(71) Applicant: KYOCERA Document Solutions Inc., Osaka (JP)

(72) Inventors: Tomohiro Sue, Osaka (JP); Daisuke Fujiwara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/682,981

(22) Filed: Apr. 9, 2015

(65) Prior Publication Data
US 2015/0293467 A1 Oct. 15, 2015

(30) Foreign Application Priority Data
Apr. 10, 2014 (JP) .................. 2014-081064

(51) Int. Cl.
*G03G 15/043* (2006.01)
*G02B 26/10* (2006.01)

(52) U.S. Cl.
CPC ............. *G03G 15/043* (2013.01); *G02B 26/10* (2013.01)

(58) Field of Classification Search
CPC .............................. G03G 15/043; G02B 26/10
See application file for complete search history.

(56) References Cited

FOREIGN PATENT DOCUMENTS

JP 2006-181872 A 7/2006
JP 2006181872 A * 7/2006

* cited by examiner

*Primary Examiner* — Sarah Al Hashimi
(74) *Attorney, Agent, or Firm* — Studebaker & Brackett PC

(57) ABSTRACT

An image forming apparatus includes scanning targets, an optical scanning section, a cassette, a cassette insertion section, and a cassette guide. The optical scanning section scans the scanning targets with light. The cassette guide is disposed in the cassette insertion section and guides the cassette. The optical scanning section includes a plurality of reflecting members corresponding one-to-one with the scanning targets. Each reflecting member directs the light to a corresponding one of the scanning targets. The cassette guide includes one or more adjustment mechanisms that are equal in number to a prescribed number of reflecting members out of the plurality of reflecting members. The prescribed number of adjustment mechanisms correspond one-to-one with the prescribed number of reflecting members. Each adjustment mechanism adjusts a position of a corresponding one of the reflecting members.

12 Claims, 10 Drawing Sheets

IMAGE FORMING APPARATUS

INCORPORATION BY REFERENCE

The present application claims priority under 35 U.S.C. §119 to Japanese Patent Application No. 2014-081064, filed Apr. 10, 2014. The contents of this application are incorporated herein by reference in their entirety.

BACKGROUND

The present disclosure relates to image forming apparatuses.

Typical image forming apparatuses, such as printers and copiers, may cause image skew when forming an image on a sheet. Image skew refers to forming an inclined image on a sheet. Image skew may occur when the main scanning direction is inclined relative to a photosensitive drum. In particular, since a color image forming apparatus includes a plurality of photosensitive drums, deviation in the main scanning directions of the respective photosensitive drums may lead to color misregistration in a resulting image.

To reduce the inclination of the main scanning direction relative to a photosensitive drum, in other words, to adjust the skewing, the position of the reflecting mirror disposed inside a laser scanning unit (LSU) is adjusted.

Some image forming apparatuses include an LSU disposed to be accessible (i.e., reachable) from the side of the image forming apparatus in order to make adjustment to adjust image skew. For example, such an image forming apparatus has a hole in a lateral surface, and a tool is inserted through the hole to access the LSU and adjust the position of the reflecting mirror.

SUMMARY

According to one aspect of the present disclosure, an image forming apparatus includes a plurality of scanning targets, an optical scanning section, a cassette, a cassette insertion section, and a cassette guide. An optical scanning section scans the plurality of scanning targets with light. The cassette stores sheets therein. The cassette insertion section is configured such that the cassette is inserted into the cassette insertion section. The cassette guide is disposed in the cassette insertion section and guides the cassette. The optical scanning section includes a plurality of reflecting members corresponding one-to-one with the scanning targets. Each of the reflecting members directs the light to a corresponding one of the scanning targets. The cassette guide includes one or more adjustment mechanisms that are equal in number to a prescribed number of reflecting members out of the plurality of reflecting members. The prescribed number of adjustment mechanisms corresponds one-to-one with the prescribed number of reflecting members. Each of the prescribed number of adjustment mechanisms adjusts a position of a corresponding one of the reflecting members.

DETAILED DESCRIPTION

The following describes an embodiment of the present disclosure, with reference to the accompanying drawings. Note that the same or corresponding components are denoted by the same reference signs in the figures and a description of such a component is not repeated.

Figure 1A:
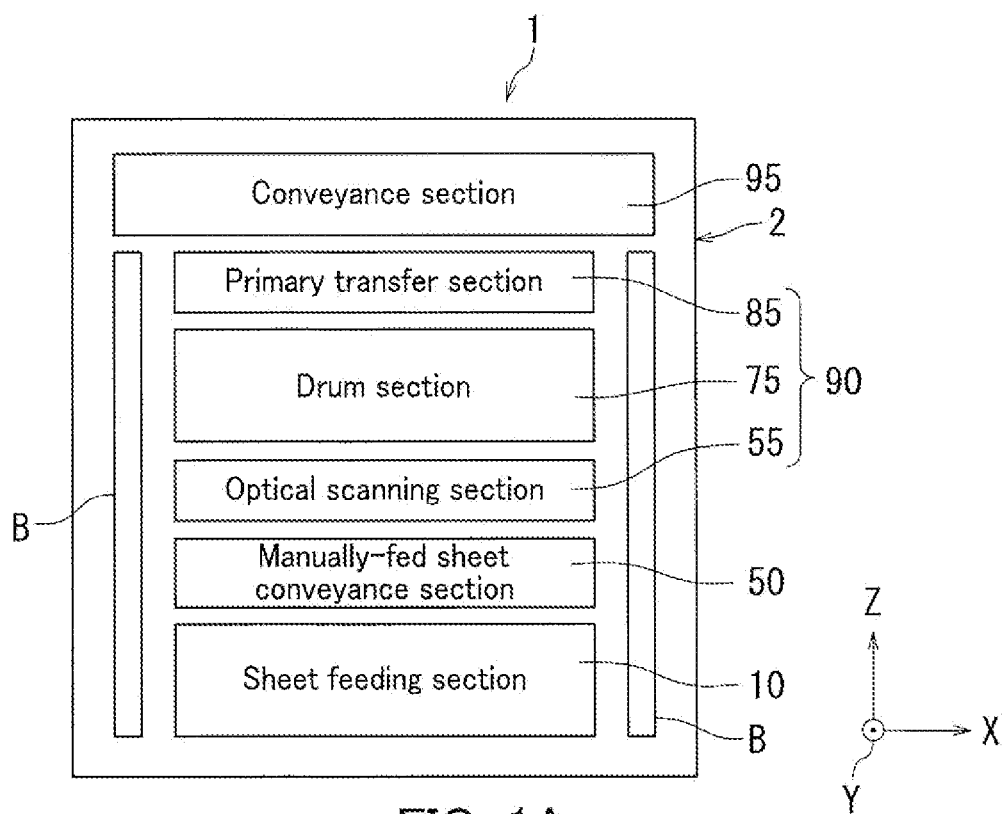
FIG. 1A is a front cross-sectional view of an image forming apparatus according to an embodiment of the present disclosure, schematically showing the internal structure.
Figure 1B:
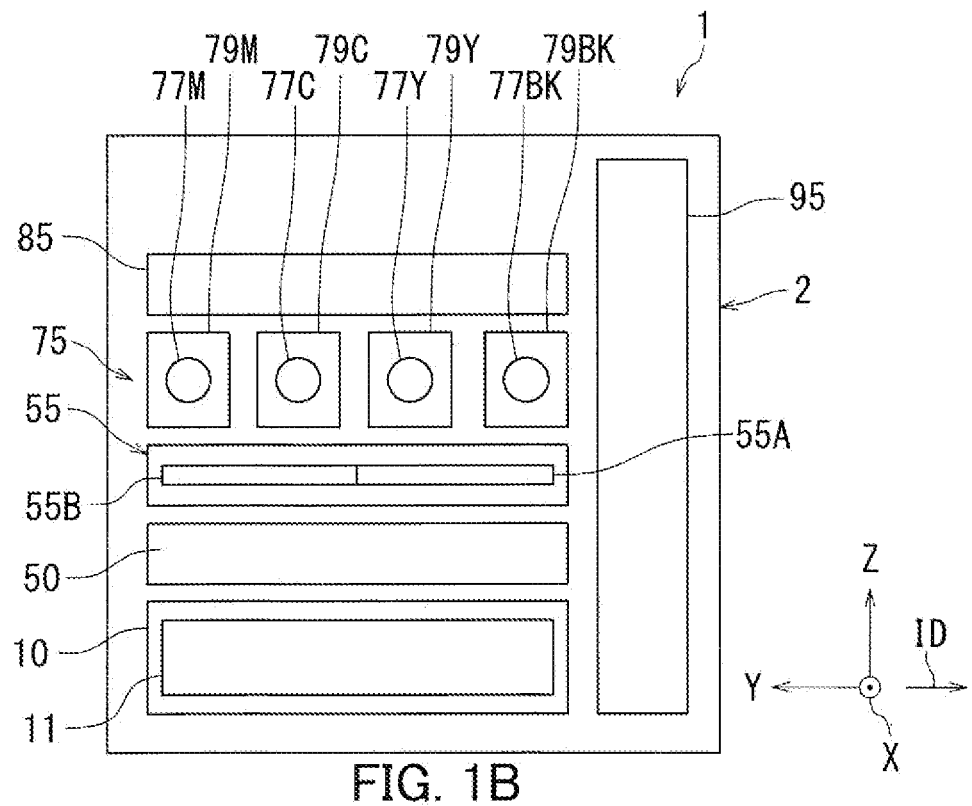
FIG. 1B is a side cross-sectional view of the image forming apparatus according to the embodiment of the present disclosure, schematically showing the internal structure.
Figure 2:
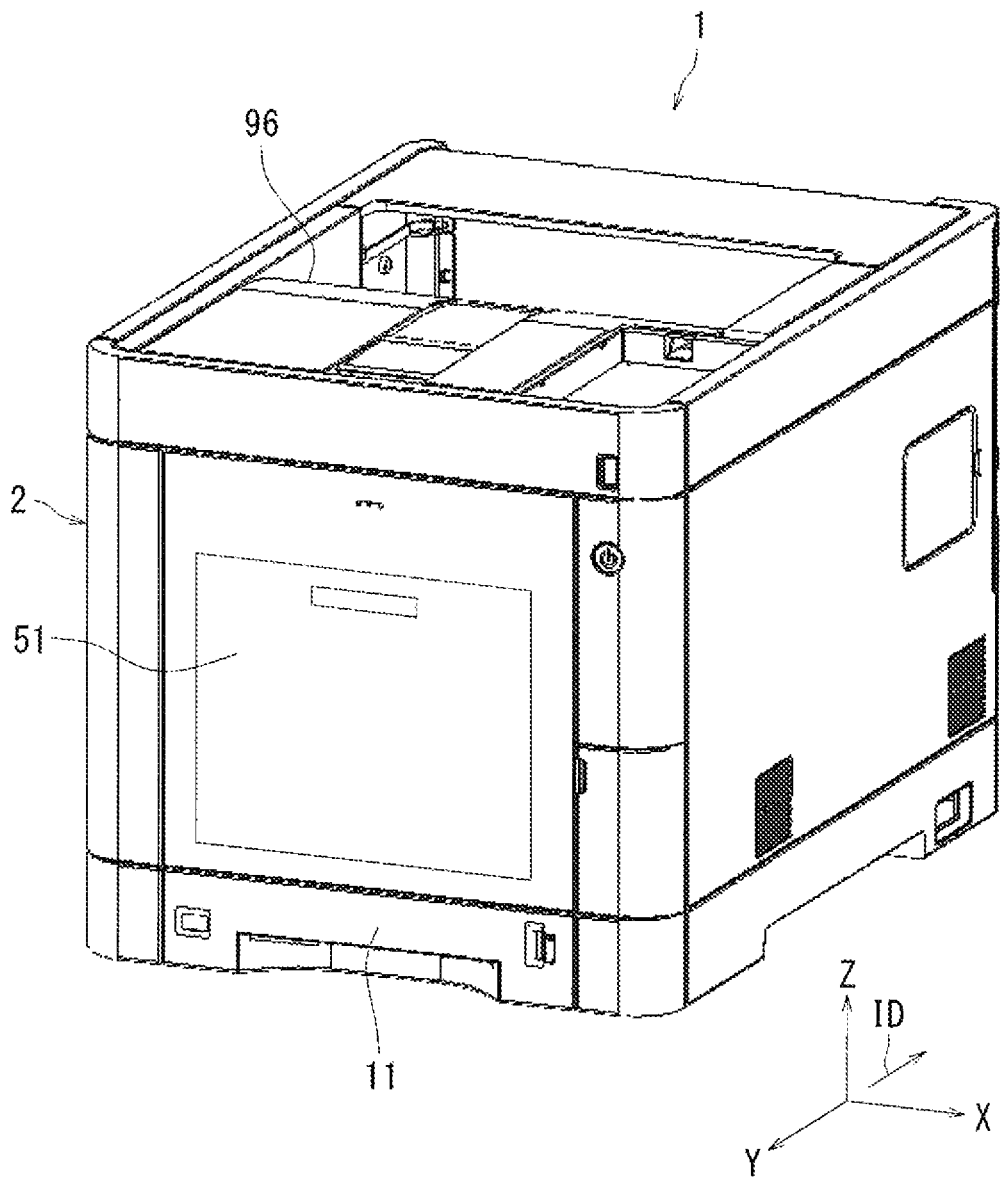
FIG. 2 is a perspective view of the image forming apparatus according to the embodiment of the present disclosure.

FIG. 1A is a front cross-sectional view and FIG. 1B is a side cross-sectional view each schematically showing the internal structure of an image forming apparatus 1 according to the embodiment of the present disclosure. FIG. 2 is a perspective view of the image forming apparatus 1. The image forming apparatus 1 according to the present embodiment is a printer. In the present embodiment, the X axis and the Y axis are parallel to the horizontal plane, whereas the Z axis is parallel to the vertical axis. The X, Y, and Z axes intersect one another. The positive direction along the Y axis is defined as a direction toward the front, and the negative direction along the Y axis is defined as an insertion direction ID in which a cassette 11 is inserted.

The image forming apparatus 1 includes a housing 2, a sheet feeding section 10, a manually-fed sheet conveyance section 50, an image forming section 90, a conveyance section 95, two substrates B, a manual feed tray 51, and an exit tray 96. The housing 2 houses therein the sheet feeding section 10, the manually-fed sheet conveyance section 50, the image forming section 90, the conveyance section 95, and the two substrates B. The substrates B are each disposed along an inner lateral surface of the housing 2. More specifically, the two substrates B are disposed along the opposite lateral surfaces of the image forming apparatus 1 such that the sheet feeding section 10, the manually-fed sheet conveyance section 50, and the image forming section 90 are located between the substrates B. Providing the substrates B along the lateral surfaces is effective for the image forming apparatus 1 to have a smaller footprint and lower profile. Note that the number of substrates B may be one or may be three or more.

The sheet feeding section 10 includes the cassette 11 for storing sheets therein. The image forming section 90 includes an optical scanning section 55, a drum section 75, and a primary transfer section 85. The optical scanning section 55 includes a laser scanning unit 55A (hereinafter, simply "LSU 55A") and a laser scanning unit 55B (hereinafter, simply "LSU 55B").

The drum section 75 includes units 79BK, 79Y, 79C, and 79M. The unit 79BK includes a photosensitive drum 77BK (scanning target). The unit 79Y includes a photosensitive drum 77Y (scanning target). The unit 79C includes a photosensitive drum 77C (scanning target). The unit 79M includes a photosensitive drum 77M (scanning target). Each of the units 20BK to 20M includes a charger, a developing device, a static eliminator, and a cleaner.

The following describes an image forming process. The sheet feeding section 10 feeds sheets stored in the cassette 11 to the conveyance section 95 one by one. Sheets placed on the manual feed tray 51 are fed to the manually-fed sheet conveyance section 50 one by one. The manually-fed sheet conveyance section 50 conveys each sheet to the conveyance section 95, and the conveyance section 95 conveys the sheet to the image forming section 90.

The image forming section 90 forms an image on a sheet. More specifically, the respective chargers of the units 79BK to 79M charge the photosensitive drums 77BK to 77M, respectively. The optical scanning section 55 scans the respective photosensitive drums 77BK to 77M with a laser beam (light).

More specifically, the LSU 55A scans the charged photosensitive drum 77BK with a laser beam in the main scanning direction, forming an electrostatic latent image on the photosensitive drum 77BK. The LSU 55A also scans the charged photosensitive drum 77Y with a laser beam in the main scanning direction, forming an electrostatic latent image on the photosensitive drum 77Y.

The LSU 55B scans the charged photosensitive drum 77C with a laser beam in the main scanning direction, forming an electrostatic latent image on the photosensitive drum 77C. The LSU 55B also scans the charged photosensitive drum 77M with a laser beam in the main scanning direction, forming an electrostatic latent image on the photosensitive drum 77M.

The main scanning direction of each of the photosensitive drums 77BK to 77M is parallel to the rotation axis of the corresponding one of the photosensitive drums 77BK to 77M. Note that the main scanning direction of the photosensitive drum 77BK is opposite to the main scanning direction of the photosensitive drum 77Y. In addition, the main scanning direction of the photosensitive drum 77C is opposite to the main scanning direction of the photosensitive drum 77M. The present specification may use the term "main scanning direction" to refer generally to any of the main scanning directions on the photosensitive drums 77BK to 77M.

On the photosensitive drums 77BK to 77M, toner images (developer images) are formed with developers of different colors based on electrostatic latent images formed by the optical scanning section 55. More specifically, the developing devices of the units 79BK, 79Y, 79C, and 79M respectively form a black toner image on the circumferential surface of the photosensitive drum 77BK, a yellow toner image on the circumferential surface of the photosensitive drum 77Y, a cyan toner image on the circumferential surface of the photosensitive drum 77C, and a magenta toner image on the circumferential surface of the photosensitive drum 77M. Each toner image is formed by developing an electrostatic latent image formed on the circumferential surface of a corresponding one of the photosensitive drums 77BK, 77Y, 77C, and 77M.

The primary transfer section 85 has a primary transfer belt to which the toner images formed on the photosensitive drums 77BK to 77M are transferred and superimposed into a color image. The image forming section 90 additionally includes a secondary transfer roller. The secondary transfer roller is disposed to sandwich a sheet with the primary transfer belt and transfers the color image from the primary transfer belt to the sheet.

The image forming apparatus 1 additionally includes a fixing section that is housed in the housing 2. The conveyance section 95 conveys a sheet to the fixing section after an image is formed on the sheet. The fixing section applies heat and pressure to the sheet to fix the image to the sheet. The conveyance section 95 discharges the sheet onto the exit tray 96 after the image is fixed to the sheet.

Figure 3:
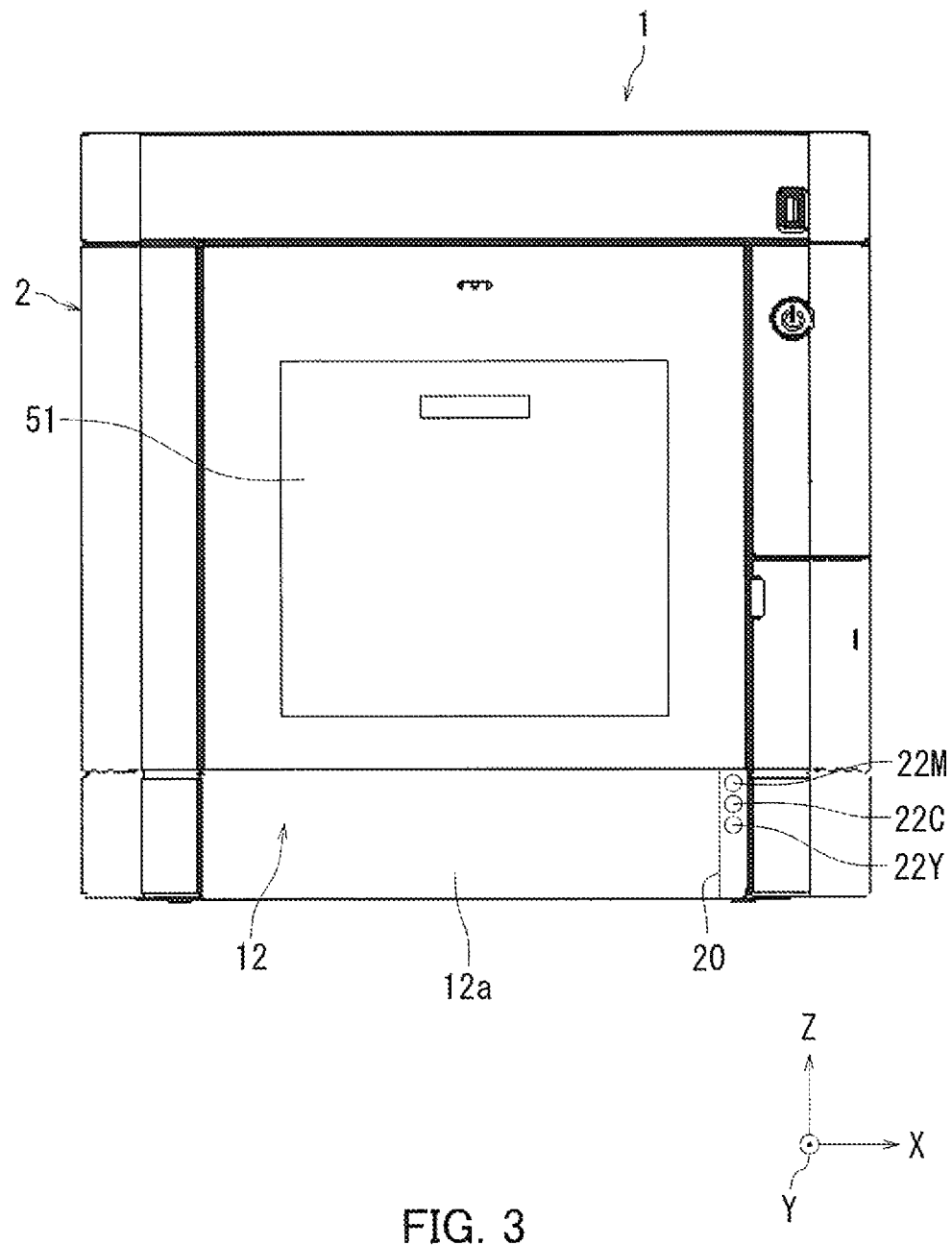
FIG. 3 is a front view of the image forming apparatus according to the embodiment of the present disclosure.

With reference to FIGS. 2 and 3, the following describes the cassette 11 and a cassette guide 20. The cassette 11 is inserted into the image forming apparatus 1 from the front. FIG. 3 is a front view of the image forming apparatus 1. FIG. 3 illustrates the image forming apparatus 1 with the cassette 11 having been removed. The image forming apparatus 1 additionally includes: a cassette insertion section 12 for receiving insertion of the cassette 11; and the cassette guide 20. The cassette insertion section 12 is formed as a part of the housing 2, and the cassette guide 20 is housed in the housing 2.

The cassette insertion section 12 has an insertion slot 12a. The insertion slot 12a is located in the front face of the image forming apparatus 1. Therefore, an operator standing toward the front of the image forming apparatus 1 can insert the cassette 11 into or pull the cassette 11 out from the cassette insertion section 12 through the insertion slot 12a.

The cassette guide 20 is disposed on one lateral surface of the cassette insertion section 12 and extends from the insertion slot 12a inwardly of the cassette insertion section 12 (toward the back of the image forming apparatus 1). The cassette guide 20 disposed in the cassette insertion section 12 guides the cassette 11. The cassette guide 20 is provided with a function of detecting the insertion of the cassette 11 and serves as a guide for removing paper jamming occurred in the manually-fed sheet conveyance section 50.

Figure 4:
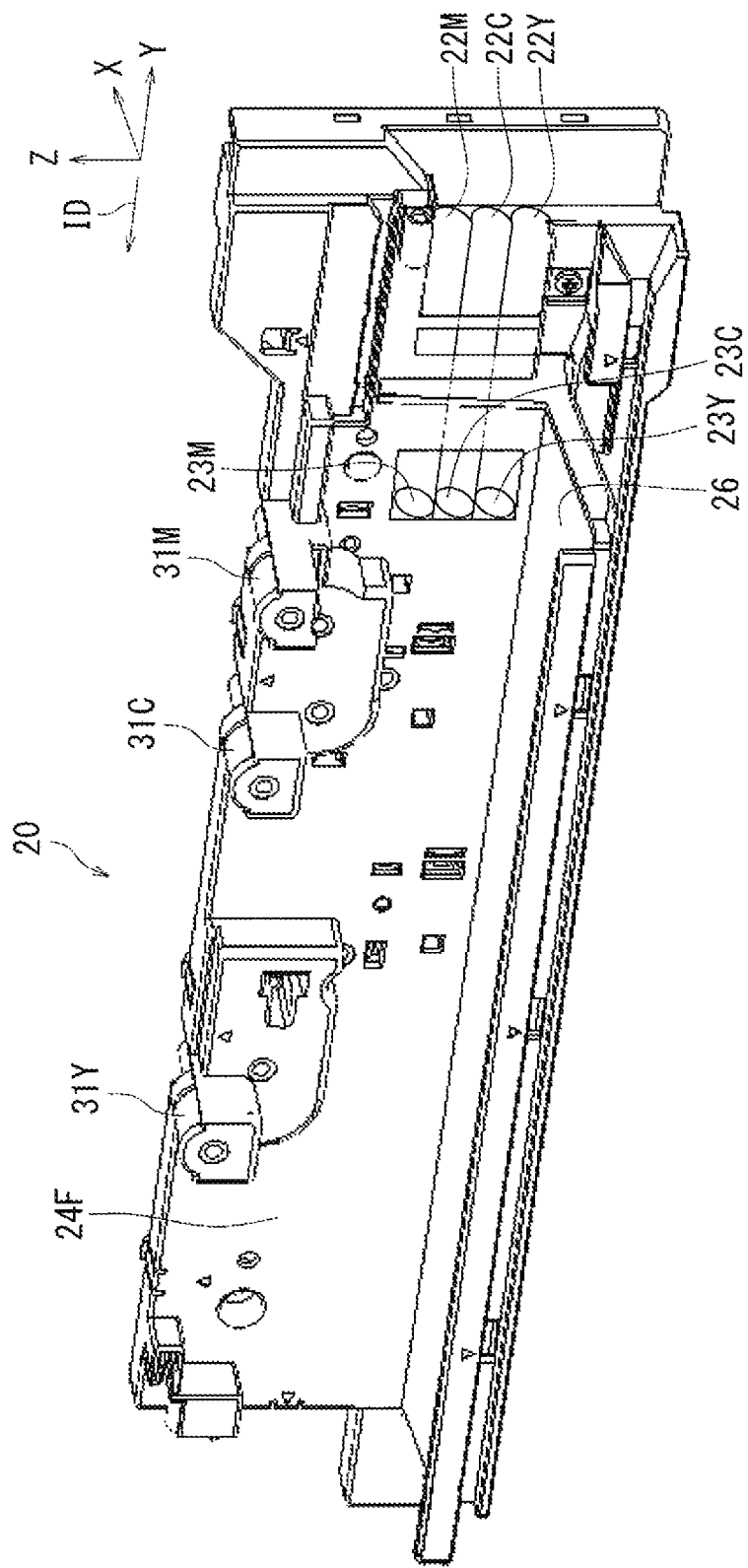
FIG. 4 is a perspective view of a cassette guide of the image forming apparatus according to the embodiment of the present disclosure.
Figure 5:
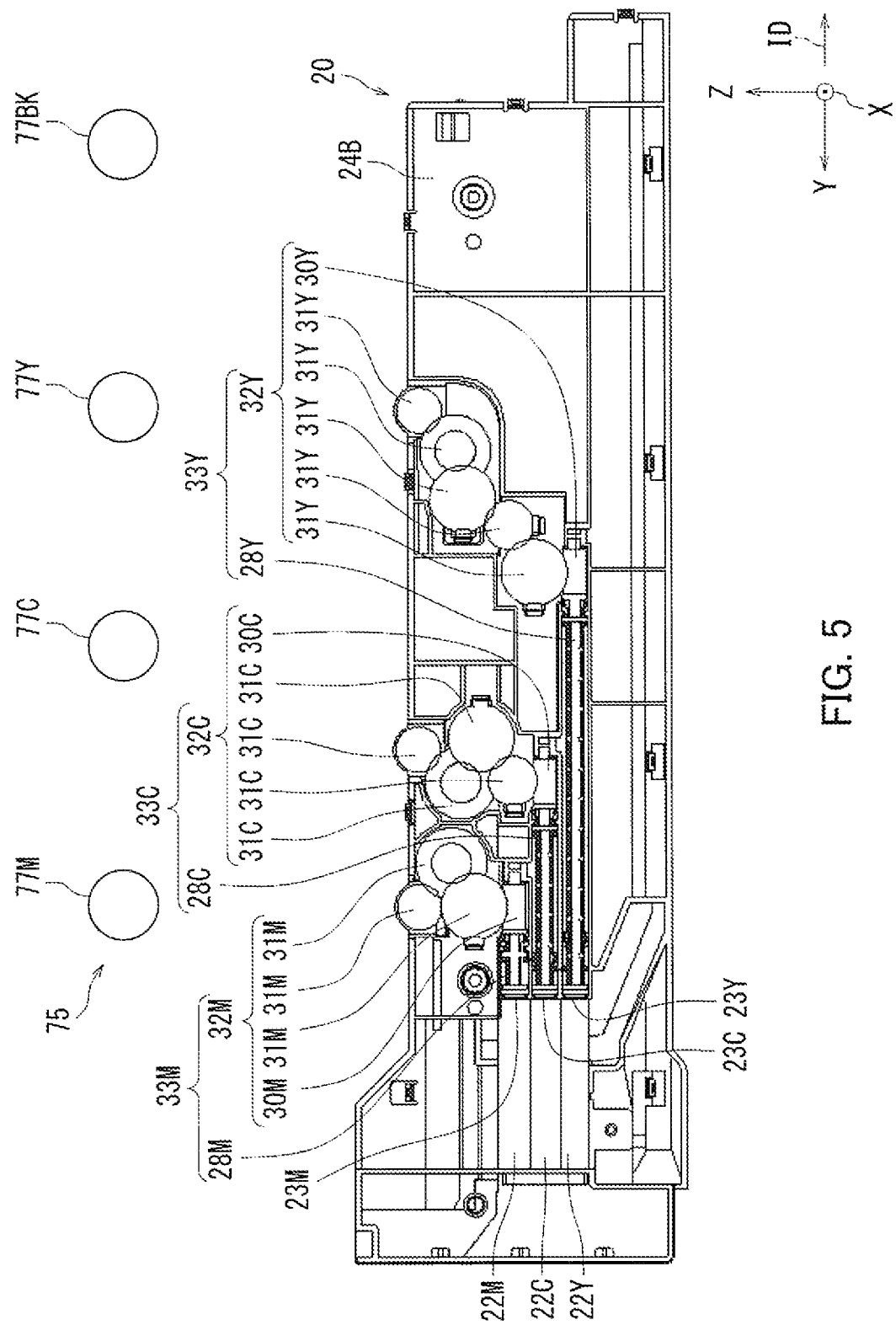
FIG. 5 is a cross-sectional view of the cassette guide of the image forming apparatus according to the embodiment of the present disclosure.

With reference to FIGS. 4 and 5, the cassette guide 20 is described in detail. FIG. 4 is a perspective view of the cassette guide 20, showing a guide surface 24F. The cassette guide 20 extends in the insertion direction ID and has the guide surface 24F and a rail 26. The guide surface 24F faces the cassette 11 inserted into the cassette insertion section 12. The rail 26 is disposed along the lower end of the cassette guide 20. The cassette 11 slides along the rail 26 when inserted into or pulled out from the cassette insertion section 12.

FIG. 5 is a cross-sectional view of the cassette guide 20. The cassette guide 20 includes adjustment mechanisms 33Y, 33C, and 33M disposed on a rear surface 24B of the guide surface 24F. The adjustment mechanism 33Y adjusts skewing of an image to be formed on the photosensitive drum 77Y. The adjustment mechanism 33C adjusts skewing of an image to be formed on the photosensitive drum 77C. The adjustment mechanism 33M adjusts skewing of an image to be formed on the photosensitive drum 77M.

The adjustment mechanism 33Y includes a shaft member 28Y and a rotation mechanism 32Y. The shaft member 28Y extends in the longitudinal direction (insertion direction ID) of the cassette guide 20. The rotation mechanism 32Y is linked to a tip portion of the shaft member 28Y and rotates according to rotation of the shaft member 28Y. More specifically, the rotation mechanism 32Y includes a worm gear 30Y and five gears 31Y. The five gears 31Y are linked to one another. The worm gear 30Y is fixed to the tip portion of the shaft member 28Y. The worm gear 30Y is also linked to a furthest downstream gear among the five gears 31Y. Consequently, when the shaft member 28Y axially rotates, the worm gear 30Y rotates, which sequentially rotates the five gears 31Y.

The adjustment mechanism 33C includes a shaft member 28C and a rotation mechanism 32C. The shaft member 28C extends in the longitudinal direction of the cassette guide 20. The rotation mechanism 32C is linked to a tip portion of the shaft member 28C and rotates according to rotation of the shaft member 28C. More specifically, the rotation mechanism 32C includes a worm gear 30C and four gears 31C. The four gears 31C are linked to one another. The worm gear 30C is fixed to the tip portion of the shaft member 28C. The worm gear 30C is also linked to a furthest downstream gear among the four gears 31C. Consequently, when the shaft member 28C axially rotates, the worm gear 30C rotates, which sequentially rotates the four gears 31C.

The adjustment mechanism 33M includes a shaft member 28M and a rotation mechanism 32M. The shaft member 28M extends in the longitudinal direction of the cassette guide 20. The rotation mechanism 32M is linked to a tip portion of the shaft member 28M and rotates according to rotation of the shaft member 28M. More specifically, the rotation mechanism 32M includes a worm gear 30M and three gears 31M. The three gears 31M are linked to one another. The worm gear 30M is fixed to the tip portion of the shaft member 28M. The worm gear 30M is linked to a furthest downstream gear among the three gear 31M. Consequently, when the shaft member 28M axially rotates, the worm gear 30M rotates, which sequentially rotates the three gears 31M.

A base end face 23Y of the shaft member 28Y is located closer to the insertion slot 12a of the cassette insertion section 12 than the tip portion of the shaft member 28Y. The base end face 23C of the shaft member 28C is located closer to the insertion slot 12a than the tip portion of the shaft member 28C. The base end face 23M of the shaft member 28M is located closer to the insertion slot 12a than the tip portion of the shaft member 28M. More specific details are as follows.

The cassette guide 20 has insertion passages 22Y, 22C, and 22M all having the same length (the same prescribe length). The insertion passages 22Y to 22M each extend in the longitudinal direction of the cassette guide 20 form a location near the insertion slot 12a toward the back of the cassette insertion section 12. The backward end of the insertion passages 22Y is located at the base end face 23Y of the shaft member 28Y. The backward end of the insertion passages 22C is located at the base end face 23C of the shaft member 28C. The backward end of the insertion passages 22M is located at the base end face 23M of the shaft member 28M.

The length of the insertion passages 22Y to 22M is determined based on the length of a tool used to access the base end faces 23Y to 23M. Therefore, the base end faces 23Y to 23M are each located deeper than the insertion slot 12a (that is, the base end faces 23Y to 23M are each located more inwardly than the insertion slot 12a in the longitudinal direction of the cassette guide 20) by a distance according to the length of a tool to be used.

Figure 6:
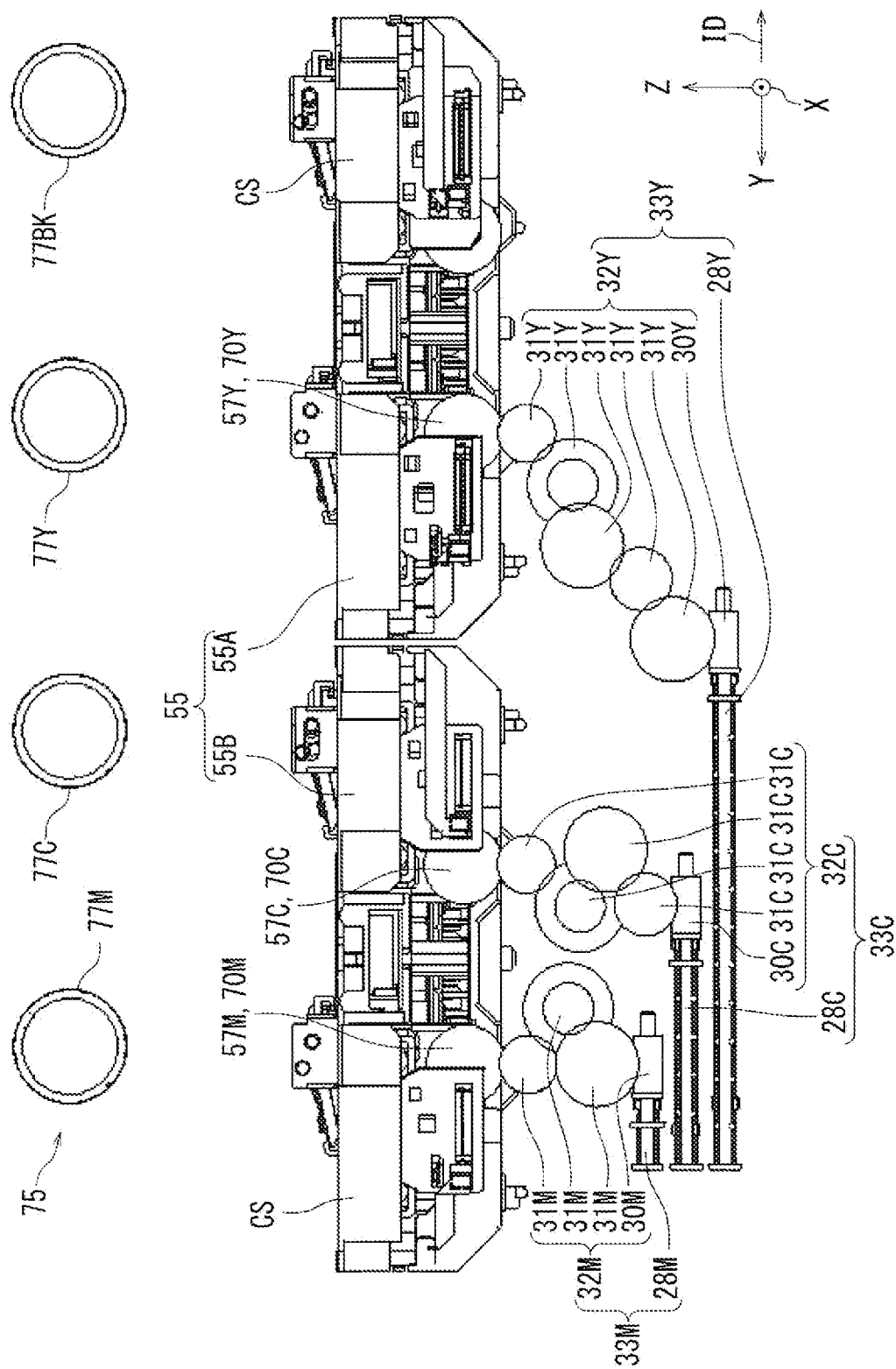
FIG. 6 is a side view of the image forming apparatus according to the embodiment of the present disclosure, showing adjustment mechanisms, the appearance of an optical scanning section, and drum sections.
Figure 7:
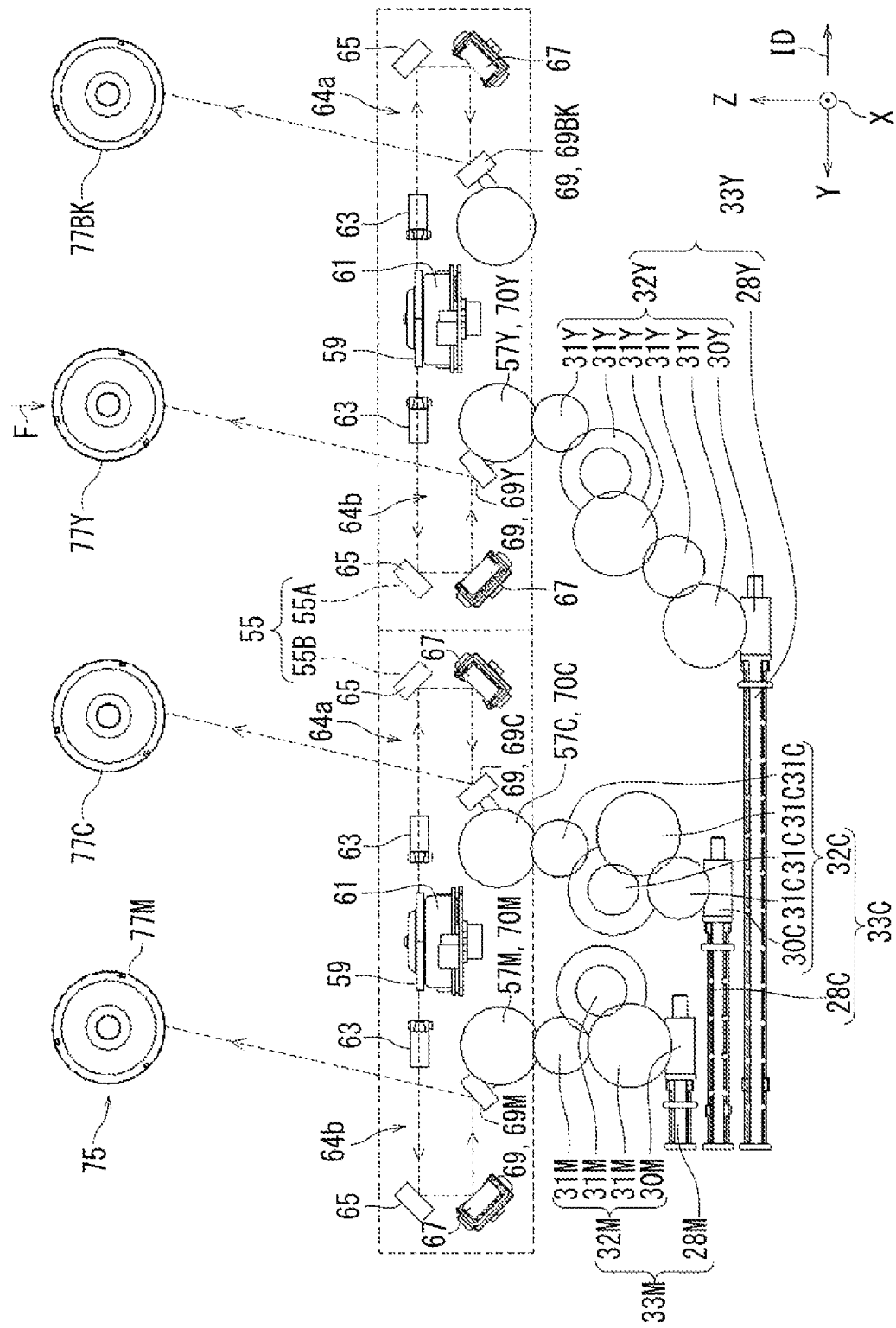
FIG. 7 is a side view of the image forming apparatus according to the embodiment of the present disclosure, showing the adjustment mechanisms, the internal structure of the optical scanning section, and the drum sections.

With reference to FIGS. 6 and 7, the LSUs 55A and 55B are described in detail. FIG. 6 is a side view showing the adjustment mechanisms 33Y to 33M, the appearance of the LSUs 55A and 55B, and the photosensitive drums 77BK to 77M. The LSUs 55A and 55B included in the optical scanning section 55 each have a casing CS. The casing CS accommodates various components, such as optical components and electronic components.

FIG. 7 is a side view of the adjustment mechanisms 33Y to 33M, the internal structure of the LSUs 55A and 55B, and the photosensitive drums 77BK to 77M. The optical scanning section 55 includes a plurality of reflecting mirrors 69 (reflecting members). The reflecting mirrors 69 are disposed in one-to-one correspondence with the photosensitive drums 77BK to 77M. More specific details are as follows.

Each of the LSUs 55A and 55B include a polygon mirror 59, a motor 61, and output optical systems 64a and 64b. The motor 61 rotates the polygon mirror 59. The polygon mirror 59 reflects an incident laser beam while being rotated. The output optical systems 64a and 64b are disposed symmetrically to each other relative to the rotation axis of the motor 61. Each of the output optical systems 64a and 64b includes an fθ lens 63 and reflecting mirrors 65, 67, and 69.

A laser beam reflected by the polygon mirror 59 of the LSU 55A travels in the output optical system 64a sequentially via the fθ lens 63 and the reflecting mirrors 65 and 67 to reach the reflecting mirror 69. The reflecting mirror 69 directs the laser beam incident thereon toward the photosensitive drum 77BK. The reflecting mirror 69 may also be denoted by the reference sign 69BK.

A laser beam reflected by the polygon mirror 59 of the LSU 55A travels in the output optical system 64b sequentially via the fθ lens 63 and the reflecting mirrors 65 and 67 to reach the reflecting mirror 69. The reflecting mirror 69 directs the laser beam incident thereon toward the photosensitive drum 77Y. The reflecting mirror 69 may also be denoted by the reference sign 69Y.

In a similar manner, a laser beam reflected by the polygon mirror 59 of the LSU 55B is guided toward the photosensitive drum 77C by the reflecting mirror 69 of the output optical system 64a. The reflecting mirror 69 may also be denoted by the reference sign 69C. In a similar manner, a laser beam reflected by the polygon mirror 59 of the LSU 55B is guided toward the photosensitive drum 77M by the reflecting mirror 69 of the output optical system 64b. The reflecting mirror 69 may also be denoted by the reference sign 69M.

The LSU 55A additionally includes a link mechanism 70Y that in turn includes a gear 57Y. The LSU 55B includes link mechanisms 70C and 70M respectively including a gear 57C and a gear 57M.

The description below is first directed to the relative dispositions of the adjustment mechanisms 33Y to the 33M and then to the link mechanisms 70Y to 70M. The adjustment mechanisms 33Y to 33M are disposed in one-to-one correspondence with a prescribed number Q of reflecting mirrors 69Y to 69M out of the plurality of reflecting mirrors 69BK to 69M. In short, the cassette guide 20 includes the adjustment mechanisms 33Y to 33M that are equal in number to the prescribed number Q. In the present embodiment, the prescribed number Q is three. The adjustment mechanisms 33Y to 33M each adjust the position of a corresponding one of the reflecting mirrors 69Y to 69M.

The description refers back to the link mechanisms 70Y to 70M. The link mechanisms 70Y to 70M are disposed in one-to-one correspondence with the prescribed number Q of the adjustment mechanisms 33Y to 33M. In short, the optical scanning section 55 includes the link mechanisms 70Y to 70M that are equal in number to the prescribed number Q.

The link mechanism 70Y links the rotation mechanism 32Y to the reflecting mirror 69Y and adjusts the position of the reflecting mirror 69Y in accordance with rotation of the rotation mechanism 32Y. More specifically, the link mechanism 70Y is linked to a furthest upstream gear among the gears 31Y of the rotation mechanism 32Y. That is, the gear 57Y of the link mechanism 70Y is linked to the furthest upstream gear 31Y of the rotation mechanism 32Y. Therefore, when the shaft member 28Y axially rotates, the gear 57Y is rotated via the rotation mechanism 32Y. The link mechanism 70Y changes the position of the reflecting mirror 69Y according to rotation of the gear 57Y.

The link mechanism 70C links the rotation mechanism 32C to the reflecting mirror 69C and adjusts the position of the reflecting mirror 69C according to rotation of the rotation mechanism 32C. More specifically, the link mechanism 70C is linked to a furthest upstream gear among the gears 31C of the rotation mechanism 32C. That is, the gear 57C of the link mechanism 70C is linked to the furthest upstream gear 31C of the rotation mechanism 32C. Therefore, when the shaft member 28C axially rotates, the gear 57C is rotated via the rotation mechanism 32C. The link mechanism 70C changes the position of the reflecting mirror 69C according to rotation of the gear 57C.

The link mechanism 70M links the rotation mechanism 32M to the reflecting mirror 69M and adjusts the position of the reflecting mirror 69M according to rotation of the rotation mechanism 32M. More specifically, the link mechanism 70M is linked to a furthest upstream gear among the gears 31M of the rotation mechanism 32M. That is, the gear 57M of the link mechanism 70M is linked to the furthest upstream gear 31M of the rotation mechanism 32M. Therefore, when the shaft member 28M axially rotates, the gear 57M is rotated via the rotation mechanism 32M. The link mechanism 70M changes the position of the reflecting mirror 69M according to rotation of the gear 57M rotates. In the present embodiment, the shaft members 28M to 28Y, which are equal in number to the prescribed number Q, have different lengths in accordance with the locations of the reflecting mirrors 69M to 69Y, which are also equal in number to the prescribed number Q. That is, the respective lengths of the shaft members 28M to 28Y, which are equal in number to the prescribed number Q, differ according to the respective locations of the photosensitive drums 77M to 77Y, which are also equal in number to the prescribed number Q.

Figure 8A:
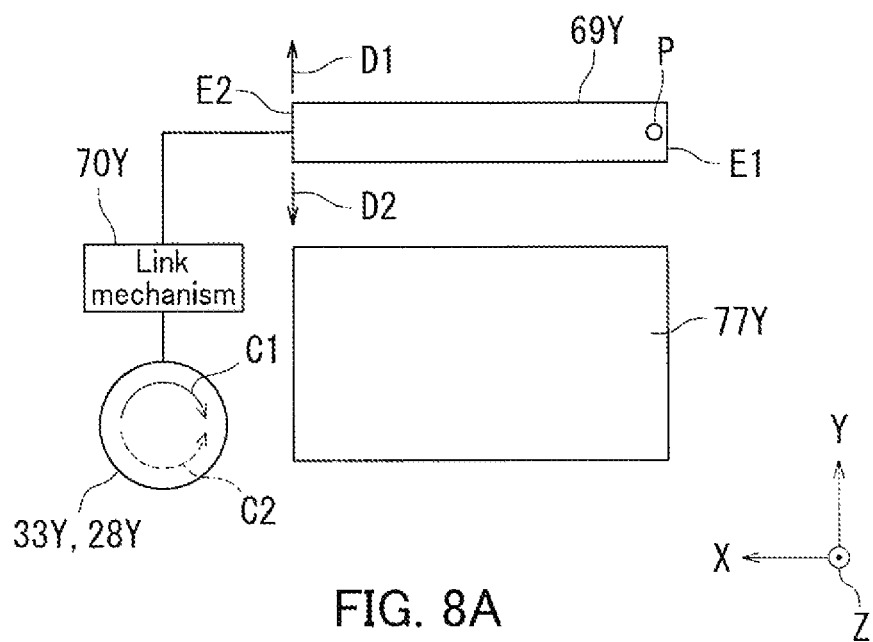
FIG. 8A is a view illustrating the position adjustment of a reflecting member of the image forming apparatus according to the embodiment of the present disclosure.
Figure 8B:
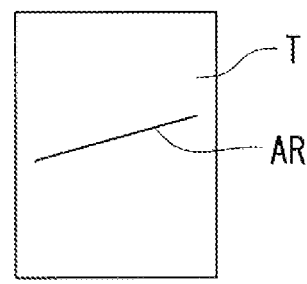
FIG. 8B illustrates an upward skewing toward the right.

With reference to FIGS. 8A and 8B, the following describes the position adjustment and the skewing adjustment of the reflecting mirrors 69Y to 69M. Note that the position adjustment of the reflecting mirrors 69C and 69M is made in the same manner as the position adjustment of the reflecting mirror 69Y. Therefore, a description thereof is omitted. In addition, the skewing adjustment by adjusting the position of the reflecting mirrors 69C and 69M is made in the same manner as the skewing adjustment by adjusting the position of the reflecting mirror 69Y. Therefore, a description thereof is omitted.

FIG. 8A illustrates the position adjustment of the reflecting mirror 69Y. FIG. 8A shows the photosensitive drum 77Y and the reflecting mirror 69Y as seen from an arrowed direction F shown in FIG. 7. The link mechanism 70Y changes the position of the reflecting mirror 69Y in a prescribed direction D1 according to clockwise rotation (indicated by an arrow C1) of the shaft member 28Y of the adjustment mechanism 33Y. More specifically, the link mechanism 70Y rotates the reflecting mirror 69Y about a fixed end E1 of the reflecting mirror 69Y as the pivot so as to shift a free end E2 of the reflecting mirror 69Y in the prescribed direction D1.

On the other hand, the link mechanism 70Y changes the position of the reflecting mirror 69Y in a prescribed direction D2, which is opposite to the prescribed direction D1, according to counterclockwise rotation (indicated by an arrow C2) of the shaft member 28Y of the adjustment mechanism 33Y. More specifically, the link mechanism 70Y rotates the reflecting mirror 69Y about the fixed end E1 of the reflecting mirror 69Y as the pivot so as to shift the free end E2 of the reflecting mirror 69Y in the prescribed direction D2.

Note that the direction of the positional change of the reflecting mirror 69Y relative to the rotation direction of the shaft member 28Y is adjusted by changing the number of gears 31Y (see FIG. 7).

The position of the reflecting mirror 69Y changes in a prescribed amount V per unit rotation angle of the shaft member 28Y. The details of the unit rotation angle will be described later. The amount of positional change of the reflecting mirror 69Y is defined by, for example, the travel distance of the free end E2 or the rotation angle of the reflecting mirror 69Y.

The amount of positional change of the reflecting mirror 69Y per unit rotation angle of the shaft member 28Y can be adjusted by changing the number of teeth of the worm gear 30Y and the number of teeth of the gears 31Y.

In response to the positional change of the reflecting mirror 69Y, the inclination of the main scanning direction relative to the photosensitive drum 77Y changes. Consequently, skewing of an image formed to be formed on the photosensitive drum 77Y can be adjusted. Note that the inclination of the main scanning direction refers to the inclination relative to the rotation axis of the photosensitive drum 77Y.

FIG. 8B illustrates "upward-right" skewing, which refers to an inclination of an image upwardly from the left to the right. Due to upward-right skewing, a line image AR formed on a sheet T is inclined upwardly from the left to the right. To correct the upward-right skewing, the shaft member 28Y is rotated clockwise (indicated by the arrow C1), which causes the link mechanism 70Y to shift the free end E2 of the reflecting mirror 69Y in the prescribed direction D1. As a result, the inclination of the main scanning direction relative to the photosensitive drum 77Y is changed to correct the upward-right skewing.

Figure 8C:
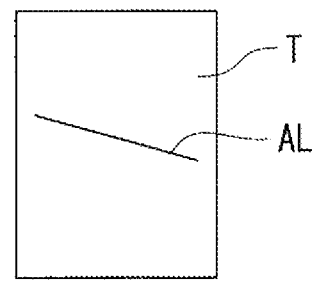
FIG. 8C illustrates an upward skewing toward the left.

FIG. 8C illustrates "upward-left" skewing, which refers to an inclination of an image upwardly from the right to the left. Due to upward-left skewing, a line image AL formed on a sheet T is inclined upwardly from the right to the left. To correct the upward-left skewing, the shaft member 28Y is rotated counterclockwise (indicated by the arrow C2), which causes the link mechanism 70Y to shift the free end E2 of the reflecting mirror 69Y in the prescribed direction D2. As a result, the inclination of the main scanning direction relative to the photosensitive drum 77Y is changed to correct the upward-left skewing.

The expressions "upward-right" skewing and "upward-left" skewing are used for convenience in the description of how an image is skewed, and any other expressions may be used.

Figure 9:
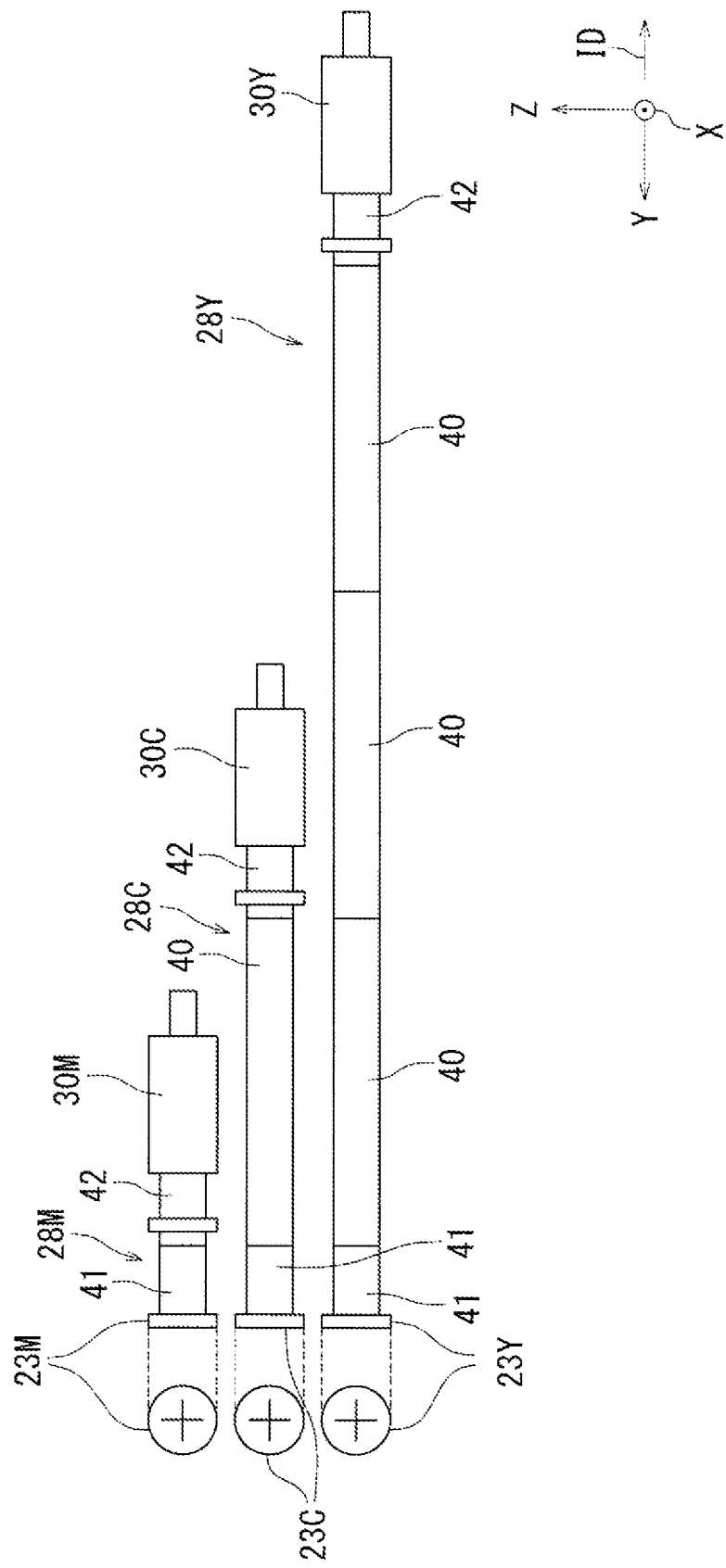
FIG. 9 is a view illustrating shaft members of the image forming apparatus according to the embodiment of the present disclosure.

With reference to FIG. 9, the shaft members 28Y to 28M are described in detail. FIG. 9 shows the shaft members 28Y to 28M. Each of the shaft members 28Y to 28M, which are equal in number to the prescribed number Q, includes a base end unit 41. At least one of the shaft members 28Y to 28M, which are which are equal in number to the prescribed number Q, additionally includes a plurality of shaft units 40. In this embodiment, the shaft member 28Y includes three shaft units 40. The shaft member 28C includes a single shaft unit 40. The shaft member 28M includes the base end unit 41 without any shaft unit 40.

Each base end unit 41 forms the base end unit of a corresponding one of the shaft members 28Y to 28M. The base end units 41 are all uniform in length and shape, and the shaft units 40 are all uniform in length and shape.

For engagement with another portion, one end of each base end unit 41 has a cross-shaped groove, a cross-shaped projection, an internal thread, or an external thread, for example. For engagement with another portion, the both ends of each shaft unit 40 have a cross-shaped groove, a cross-shaped projection, an internal thread, or an external thread, for example.

More specifically, the shaft member 28Y is formed from one base end unit 41 and three shaft units 40 that are joined together to form a linear shape. The worm gear member 42 is joined to the tip portion of the shaft unit 40 that is located furthest from the base end unit 41. The worm gear member 42 includes a worm gear 30Y. The base end unit 41 has a base end face 23Y.

The shaft member 28C is formed from one base end unit 41 and one shaft unit 40 that are joined together to form a linear shape. A worm gear member 42 is joined to the tip portion of the shaft unit 40. The worm gear member 42 includes a worm gear 30C. The base end unit 41 has a base end face 23C.

The shaft member 28M is formed from a base end unit 41. A worm gear member 42 is joined to the tip portion of the base end unit 41. The worm gear member 42 includes a worm gear 30M. The base end unit 41 has a base end face 23M.

The worm gear members 42 are all uniform in length and shape. For engagement with another portion, an end of each worm gear member 42 has a cross-shaped groove, a cross-shaped projection, an internal thread, or an external thread.

With reference to FIG. 9, the shapes and colors of the base end faces 23Y to 23M are described. As shown in FIG. 9, the base end faces 23Y to 23M have a shape conforming to the shape of a tool. For example, the base end faces 23Y to 23M have a shape conforming to a general-purpose tool.

In the present embodiment, the base end faces 23Y to 23M have a cross-shaped groove conforming to the tip shape of a crosshead screwdriver. Therefore, each of the shaft members 28Y to 28M can be rotated with a crosshead screwdriver, adjusting the position of a corresponding one of the reflecting mirrors 69Y to 69M.

The base end face 23Y is in yellow to visually indicate the color of a toner image formed on the corresponding photosensitive drum 77Y. The base end face 23C is in cyan to visually indicate the color of a toner image formed on the corresponding photosensitive drum 77C. The base end face 23M is in magenta to visually indicate the color of a toner image formed on the corresponding photosensitive drum 77M.

Figure 10A:
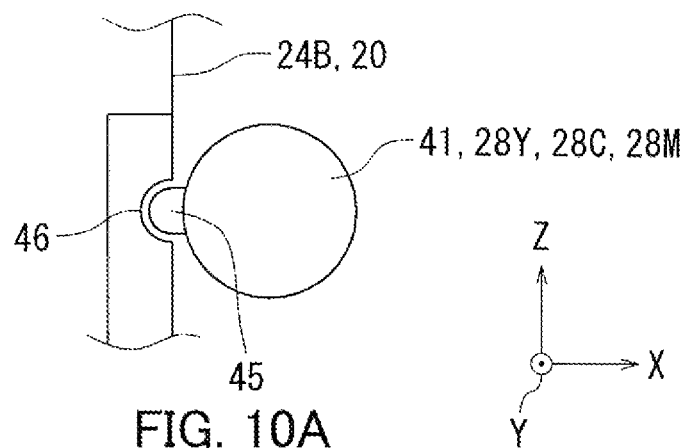
FIG. 10A is a view of a first example of a first contacting portion and a second contacting portion of the image forming apparatus according to the embodiment of the present disclosure.
Figure 10B:
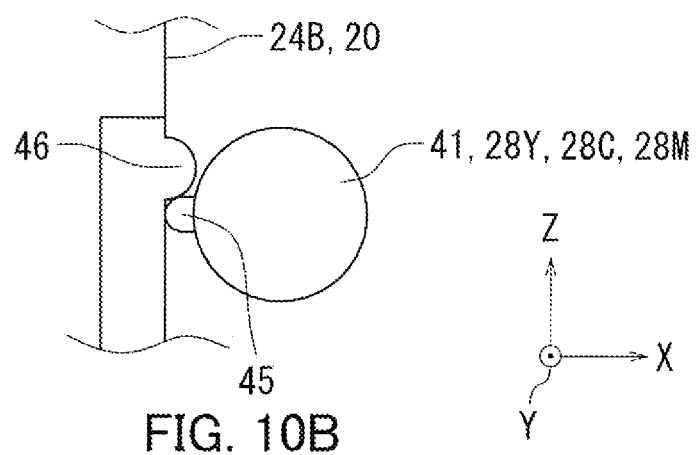
FIG. 10B is a view of a second example of a first contacting portion and a second contacting portion of the image forming apparatus according to the embodiment of the present disclosure.
Figure 10C:
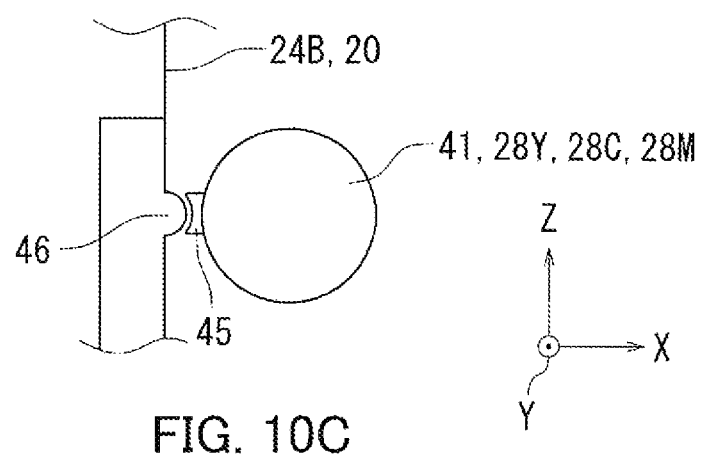
FIG. 10C is a view of a third example of a first contacting portion and a second contacting portion of the image forming apparatus according to the embodiment of the present disclosure.

With reference to FIGS. 10A, 10B, and 10C, the following describes first contacting portions 45 and second contacting portions 46. FIGS. 10A, 10B, and 10C each illustrate a first contacting portion 45 and a second contacting portion 46. Each of the shaft members 28Y and 28M has a first contacting portion 45 on its circumferential surface. Preferably, each first contacting portion 45 is formed on the circumferential surface of the base end unit 41 a corresponding one of the shaft members 28Y to 28M.

The cassette guide 20 has the second contacting portions 46. More specifically, the second contacting portions 46 are formed on the rear surface 24B of the cassette guide 20. In addition, the second contacting portions 46 are preferably formed from synthetic resin having elasticity. Each time any of the shaft members 28Y to 28M rotates by a unit rotation angle (360° in the present embodiment), the corresponding first contacting portion 45 come into contact with the corresponding second contacting portion 46. Note that the unit rotation angle is not limited to 360°. For example, to set the unit rotation angle to 90°, each of the shaft members 28Y to 28M is provided with four first contacting portions 45 at equal angular intervals on the circumferential surface. In the present embodiment, the unit rotation angle is equal to a prescribed angle.

FIGS. 10A to 10C illustrate First to Third Examples of a first contacting portion 45 and a second contacting portion 46. In Example 1 shown in FIG. 10A, the first contacting portion 45 is a projection and the second contacting portion 46 is a recess. In Example 2 shown in FIG. 10B, both the first contacting portion 45 and the second contacting portion 46 are projections. In Example 3 shown in FIG. 10C, the first contacting portion 45 is a recess and the second contacting portion 46 is a projection.

As has been described above with reference to FIGS. 1 to 8, according to the present embodiment, the cassette guide 20 is provided with the adjustment mechanisms 33Y to 33M for the positional adjustment of the reflecting mirrors 69Y to 69M. The adjustment mechanisms 33Y to 33M are located to be within easy access by the operator when the cassette 11 is removed from the cassette insertion section 12. This allows the operator to readily adjust the positions of the reflecting mirrors 69Y to 69M disposed inside the optical scanning section 55. Easy adjustment of the positions of the reflecting mirrors 69Y to 69M leads to easy adjustment of the main scanning directions relative to the photosensitive drums 77Y to 77M so as to reduce or illuminate the inclination. Consequently, the present embodiment facilitates adjustment of skewing of images to be formed on the photosensitive drums 77Y to 77M.

For example, the positions of the reflecting mirrors 69Y to 69M can be adjusted easily from outside of the image forming apparatus 1 with the optical scanning section 55 has been attached to the image forming apparatus 1. The image forming apparatus 1 may, for example, have the substrates B disposed along the opposite lateral surfaces so as to have a small footprint and low profile. Even with such a configuration, the adjustment mechanisms 33Y to 33M are reachable by the operator from the front of the image forming apparatus 1. This allows the operator to adjust the positions of the reflecting mirrors 69Y to 69M with ease.

In addition, the present embodiment allows the operator to access the adjustment mechanisms 33Y to 33M from the front of the image forming apparatus 1 with the cassette 11 removed from the cassette insertion sections 12. Different from a configuration in which the optical scanning section is accessible from a side of the image forming apparatus, the present embodiment saves trouble of providing working space for the operator to adjust the reflecting mirrors 69Y to 69M.

As has been described with reference to FIG. 5, according to the present embodiment, the base end faces 23Y to 23M are each located deeper than the insertion slot 12a by a distance corresponding to the length of a tool to be used. Consequently, the base end faces 23Y to 23M are not accessible without a tool. With a human finger, it is difficult to access the base end faces 23Y to 23M to rotate the shaft members 28Y to 28M. This is effective to prevent unintentional operation in adjusting the reflecting mirrors 69Y to 69M or to discourage end users from randomly attempting to adjust the reflecting mirrors 69Y to 69M.

As has been described with reference to FIGS. 5 to 8, the present embodiment can readily implement a mechanism of adjusting the positions of the reflecting mirrors 69Y to 69M, using a combination of the shaft members 28Y to 28M, the rotation mechanisms 32Y to 32M, and the link mechanisms 70Y to 70M.

As has been described with reference to FIGS. 8A and 8B, according to the present embodiment, the position of each of the reflecting mirrors 69Y to 69M is changed in the prescribed direction D1 when the shaft members 28Y to 28M are rotated clockwise and in the prescribed direction D2 when the shaft members 28Y to 28M are rotated counterclockwise. In other words, the adjustment mechanisms 33Y to 33M and the link mechanisms 70Y to 70M are configured to change the reflecting mirrors 69 in a common direction when the respective the shaft members are rotated in a common direction.

Consequently, upward-right skewing of images of the respective colors are adjusted by rotating the shaft members 28Y to 28M in a common direction (clockwise, for example), and upward-left skewing of images of the respective colors are adjusted by rotating the shaft members 28Y to 28M in a common direction (counterclockwise, for example). As the adjustment mechanisms 33Y to 33M are the same with respect to the relation between the rotation direction of the shaft member and the orientation of skewing to be adjusted, the adjustment work is simplified.

According to the present embodiment, in addition, the position of each of the reflecting mirrors 69Y to 69M is changed by a prescribed amount V per unit rotation angle of a corresponding one of the shaft members 28Y to 28M. That is, the adjustment mechanisms 33Y to 33M and the link mechanisms 70Y to 70M are configured to change the positions of the reflecting mirrors 69 all in an equal amount per unit rotation angle of the respective shaft members. As the adjustment mechanisms 33Y to 33M are the same with respect to the amount of skewing adjustment made per angular rotation of a corresponding shaft member, the adjustment work is simplified.

As has been described with reference to FIG. 9, according to the present embodiment, the base end faces 23Y to 23M have a shape conforming to the shape of a general-purpose tool (for example, a crosshead screwdriver). That is to say, the positions of the reflecting mirrors 69Y to 69M are adjusted by using a readily available tool. Note that the general-purpose tool to be used is not limited to a crosshead screwdriver and may be a slotted screwdriver. In this case, each of the base end faces 23Y to 23M has a "– (minus)" shaped recess groove. The adjustment mechanisms 33Y to 33M are adjusted manually with a general-purpose tool but without any mechanism or device.

According to the present embodiment, in addition, each of the base end faces 23Y to 23M has a color indicating a color of the toner image formed by a corresponding one of the photosensitive drums 77Y to 77M. In other words, the base end faces 23Y to 23M are each colored in the color of a toner image subjected to skewing adjustment by a corresponding one of the adjustment mechanisms 33Y to 33M. This allows the operator attempting to access one of the shaft members 28Y to 28M to readily distinguish the shaft members 28Y to 28M by the colors of the base end faces 23Y to 23M.

According to the present embodiment, in addition, the shaft members 28Y and 28C may each be formed from one or more shaft units 40. That is, the number of common components used in the image forming apparatus 1 can be increased, which leads to cost reduction. In addition, as the shaft units 40 are all uniform in length and shape, the length of a shaft member can be easily adjusted by changing the number of shaft units 40 to be used. In other words, shaft members can be readily formed to have different lengths according to the distances to the photosensitive drums. Some image forming apparatus may have a different configuration from the image forming apparatus 1 with respect to the relative distances between the photosensitive drums. Yet, by changing the number of shaft units 40 to be joined, shaft members can be readily made to have suitable lengths.

As has been described with reference to FIG. 10, according to the present embodiment, each time a first contacting portion 45 comes into contact with a corresponding second contacting portion 46, tactile feedback is given to the operator. Consequently, the operator rotating any of the shaft members 28Y to 28M can recognize when the shaft member makes one complete rotation. This helps the operator to make skewing adjustment.

Up to this point, the embodiment of the present disclosure has been described with reference to the accompanying drawings (FIGS. 1 to 10). However, the present disclosure is not limited to the specific embodiment described above and various alterations (for example, alterations (1) to (3) described below) may be made to practice the present disclosure. The drawings are schematic illustration focusing on the respective components to facilitate the understanding of the present disclosure. For the sake of convenience, the thickness, length, and number of each component in the drawings may differ from the actual ones. For example, FIGS. 4 to 7 show the worm gears 30Y to 30M and the gears 31Y to 31M without the teeth. In addition, the shapes and dimensions of the respective components described in the embodiment are merely examples and without limitations and various alterations may be made thereto within a scope not substantially departing from the gist of the present disclosure.

(1) In the present embodiment, the base end faces 23Y to 23M have a shape conforming to a general-purpose tool. However, the base end faces 23Y to 23M may have a shape conforming to a tool specifically prepared for the adjustment mechanisms 33Y to 33M (for example, a screwdriver designed specifically for the adjustment mechanisms 33Y to 33M). This alteration is effective to maintain the performance of the image forming apparatus 1, by preventing end users from accessing the adjustment mechanisms 33Y to 33M, which often results in improper adjustment.

(2) In the present embodiment, image skewing is adjusted relative to a black toner image. That is, the black is used as the reference color and the inclination of yellow, cyan, and magenta images is adjusted relative to the black toner image. To this end, from among the four photosensitive drums 77BK to 77M, the prescribed number Q of the photosensitive drums, namely the photosensitive drums 77Y, 77C, and 77M are subjected to the skewing adjustment. Therefore, the adjustment is made to the prescribed number Q of reflecting mirrors, namely the reflecting mirror 69Y, 69C, and 69M, by the prescribed number Q of the adjustment mechanisms, namely the adjustment mechanisms 33Y, 33C, and 33M. Note, however, that the prescribed number Q is not limited to three and may be one or two instead. That is, the prescribed number Q may be a singular number or a plural number.

The prescribed number Q may be four. In other words, skewing adjustment may be made with respect to all of the four colors. More specifically, the image forming apparatus 1 additionally includes an adjustment mechanism 33BK and a link mechanism 70Bk for the positional adjustment of the reflecting mirror 69BK. The adjustment mechanism 33BK is identical in structure to the adjustment mechanism 33Y, and the link mechanism 70Bk is identical in structure to the link mechanism 70Y. Yet, the length of a shaft member 28BK of the adjustment mechanism 33BK and the number of gears 31BK are determined in accordance with the location of the reflecting mirrors 69BK. Since this alteration allows skewing to be adjusted with respect to all of the four colors, image skewing can be adjusted relative to a sheet.

(3) The image forming apparatus 1 according to the present embodiment is a printer but may be a copier, facsimile machine, or multifunction peripheral. A multifunction peripheral combines a function of at least two of a copier, printer, and a facsimile machine.

The present disclosure is usable in the technical field relating to image forming apparatuses having a reflecting member for guiding light to a scanning target.

What is claimed is:

1. An image forming apparatus comprising:
   a plurality of scanning targets;
   an optical scanning section configured to scan the scanning targets with light;
   a cassette configured to store sheets therein;
   a cassette insertion section in which the cassette is inserted; and
   a cassette guide disposed in the cassette insertion section and configured to guide the cassette, wherein
   the optical scanning section includes a plurality of reflecting members corresponding one-to-one with the scanning targets and each configured to direct the light to a corresponding one of the scanning targets, and
   the cassette guide includes one or more adjustment mechanisms that are equal in number to a prescribed number of reflecting members out of the plurality of reflecting members, the prescribed number of adjustment mechanisms corresponding one-to-one with the prescribed number of reflecting members and each being configured to adjust a position of a corresponding one of the reflecting members.

2. The image forming apparatus according to claim 1, wherein
   each of the prescribed number of adjustment mechanisms includes
       a shaft member that extends in a longitudinal direction of the cassette guide, and
       a rotation mechanism linked to a tip portion of the shaft member and configured to rotate according to rotation of the shaft member,
   the optical scanning section further includes one or more link mechanisms that are equal in number to the prescribed number, the prescribed number of link mechanisms corresponding one-to-one with the prescribed number of adjustment mechanisms, and
   each of the prescribed number of link mechanisms links a corresponding one of the rotation mechanisms to a corresponding one of the reflecting members and changes the position of the reflecting member according to rotation of the rotation mechanism.

3. The image forming apparatus according to claim 2, wherein
   the cassette insertion section has an insertion slot, and
   a base end face of each of the shaft members is located closer to the insertion slot than the tip portion of the shaft member, and the base end face of at least one of the shaft members has a shape conforming to a shape of a tool.

4. The image forming apparatus according to claim 3, wherein
   the end face of each of the shaft members is located deeper than the insertion slot by a distance according to a length of the tool.

5. The image forming apparatus according to claim 2, wherein
   the plurality of scanning targets are configured such that developer images are formed thereon with developers of different colors based on electrostatic latent images formed by the optical scanning sections,
   the cassette insertion section has an insertion slot, and
   a base end face of each of the shaft members is located closer to the insertion slot than the tip portion of the shaft member, and the based end face of at least one of the shaft members has a color indicating a color of the developer image to be formed on a corresponding one of the scanning targets.

6. The image forming apparatus according to claim 2, wherein
   at least one of the shaft members has a first contacting portion on a peripheral surface thereof,
   the cassette guide has a second contacting portion, and
   the first contacting portion comes into contact with the second contacting portion each time the at least one of the shaft members rotates by a prescribed angle.

7. The image forming apparatus according to claim 2, wherein
   the prescribed number is greater than one, and
   at least one of the prescribed number of shaft members includes a plurality of shaft units that are uniform in length and shape.

8. The image forming apparatus according to claim 2, wherein
   each of the prescribed number of link mechanisms causes the position of a corresponding one of the reflecting members to change in a prescribed direction according to clockwise rotation of a corresponding one of the shaft members.

9. The image forming apparatus according to claim 2, wherein
   the prescribed number of link mechanisms change the positions of the prescribed number of reflecting members all in an equal amount per unit rotation angle of the respective shaft members.

10. The image forming apparatus according to claim 2, wherein
    each of the rotation mechanisms includes a worm gear and a plurality of gears linked to one another,
    the worm gear is fixed to the tip portion of a corresponding one of the shaft members and linked to a furthest downstream one of the plurality of gears, and
    a furthest upstream one of the plurality of gears is linked to a corresponding one of the link mechanisms.

11. The image forming apparatus according to claim 2, wherein
    the prescribed number of shaft members have different lengths in accordance with locations of the prescribed number of reflecting members.

12. The image forming apparatus according to claim 1, further comprising:
    a housing that
       houses the scanning targets, the optical scanning section, the cassette, and the cassette guide and
       has the cassette insertion section formed therein; and
    a substrate disposed along an inner surface of the housing.

* * * * *